Nov. 20, 1945.  R. KARLSTRÖM  2,389,435
FILTER MATERIAL
Filed Jan. 26, 1943
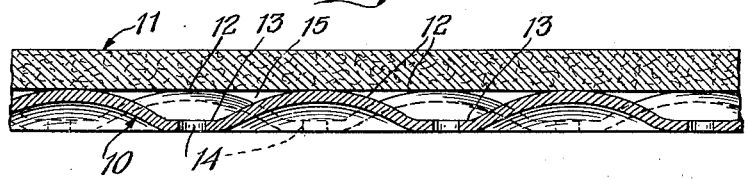
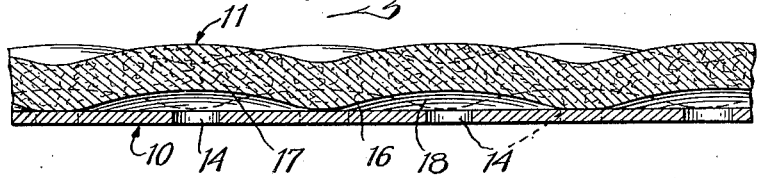
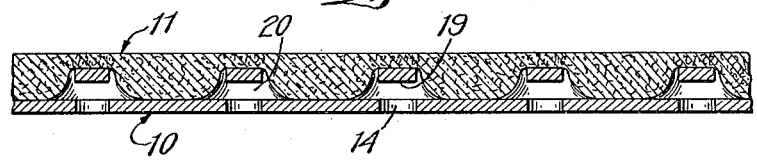
INVENTOR
Robert Karlström
BY
Murray Robinson
ATTORNEY Patented Nov. 20, 1945

2,389,435

UNITED STATES PATENT OFFICE 2,389,435

FILTER MATERIAL

Robert Karlström, Stockholm, Sweden, assignor to Electrolux Corporation, Old Greenwich, Conn., a corporation of Delaware Application January 26, 1943, Serial No. 473,609
In Sweden July 9, 1942

8 Claims. (Cl. 183—69)

The present invention relates to a filter material for fluid, such as air, and more particularly to a material of this kind which is efficient but at the same time cheap to manufacture. The material referred to may suitably be used for filtering air in vacuum cleaners, and satisfies high demands as to great separating capacity and low resistance to flow. Owing to its low cost of manufacture the filter material, when used as a vacuum cleaner filter, whether formed as a plane filter or a so-called dust bag, may be thrown away or burnt after a certain period of use, in the latter case together with the separated impurities collected in the bag. If desired, material in accordance with the invention may be used in connection with a filter of another kind, such as a textile filter, or may replace such a filter. The new filter material has great strength, which is necessary particularly in the case of bag-like filters intended for vacuum cleaners and, when in use, subjected to continuous deformations. According to the invention the filter material consists of at least two layers, namely a supporting layer and a filter layer, lying close against each other and forming a unit, the opposite surfaces of said layers adhering to each other. In a suitable embodiment of the invention a binding agent is introduced between the layers so as to cause them to adhere to each other. If desired, the material contained in one or more of the layers may itself be of such a quality that merely bringing it into contact with another layer will cause it to adhere to the latter. In this latter case it is not thus necessary to introduce any special binding agent between the layers. The supporting layer may suitably consist of perforated paper or other air-pervious material, and the filter layer may consist of a fibrous material stuck to one side of the paper between perforations. These fibers consist for instance of a vegetable material, such as cotton, animal hair, synthetic material.

In a method of manufacturing filter material according to the invention referred to the supporting layer suitably consisting of paper may first be perforated, whereupon a binding agent and then fibrous material are applied to one of its sides. In another method of manufacturing filter material according to the invention a pulp of fibrous material washed in a glue solution may be received on a wire screen, according to the Fourdrinier process, and applied to the perforated supporting layer, or a fibrous material washed in a glue solution may be applied to the supporting layer which is then perforated.

The accompanying drawing shows diagrammatically three embodiments of the invention on a considerably enlarged scale, and in the following description of these embodiments also other characteristics of the invention will be set forth.

Fig. 1 shows in section an embodiment of a filter material according to the invention in which the supporting layer is undulated, whereas the filter layer is plane.

Fig. 2 shows in section a filter material in which the supporting layer is plane, whereas the filter layer is undulated.

Fig. 3 shows a section of a filter layer in which both the supporting and filter layers are plane.

In the drawing the supporting layer is, in all figures, designated by 10, and the filter layer by 11.

Fig. 1 shows a filter material in which the supporting layer 10 is perforated prior to the application of the filter layer 11. The supporting layer is shaped so as to have elevations 12 and depressions 13, as seen from the side facing the filter layer. If desired, the perforation of the supporting layer may be effected simultaneously with the shaping in such a manner that openings 14 are made in the bottom of the depressions 13. If desired, the shaping may be performed prior to the perforation. The points of the elevations 12 are now provided with an adhesive, whereupon the filter layer 11 which, in this case is made plane, is applied. As appears from the drawing, this will form hollow spaces 15 limited partly by the walls of the elevations 12 and the depressions 13, and partly by the underside of the filter layer.

In the embodiment according to Fig. 2 the perforation of the supporting layer 10 and the shaping of the filter layer 11 are made separately, whereupon the points of the filter layer designated by 16 are provided with a binding agent. The two layers are then assembled in such a manner that said points will bear approximately against the middle of that portion of the supporting layer 10 which is between the perforations 14. The depressions of the filter layer 11 are designated by 17 and the hollow spaces limited by said depressions and the supporting layer by 18.

In the embodiment shown in Fig. 3 the perforation of the supporting layer 10 is made after the application of the filter layer 11. The perforation or punching of the supporting layer is effected without the use of any cushion, the filter layer 11 serving as a support. The portions of the supporting layer corresponding to the perforations 14 are designated by 19 and are, during punching, pressed into the material of the